INVENTORS
WERNER W. EIBE &
RICHARD W. TEPEL

ATTORNEY

Nov. 9, 1971     W. W. EIBE ETAL     3,618,462
BILLET CHIPPER

Original Filed June 14, 1968     5 Sheets-Sheet 5

INVENTORS
WERNER W. EIBE &
RICHARD W. TEPEL
BY
ATTORNEY

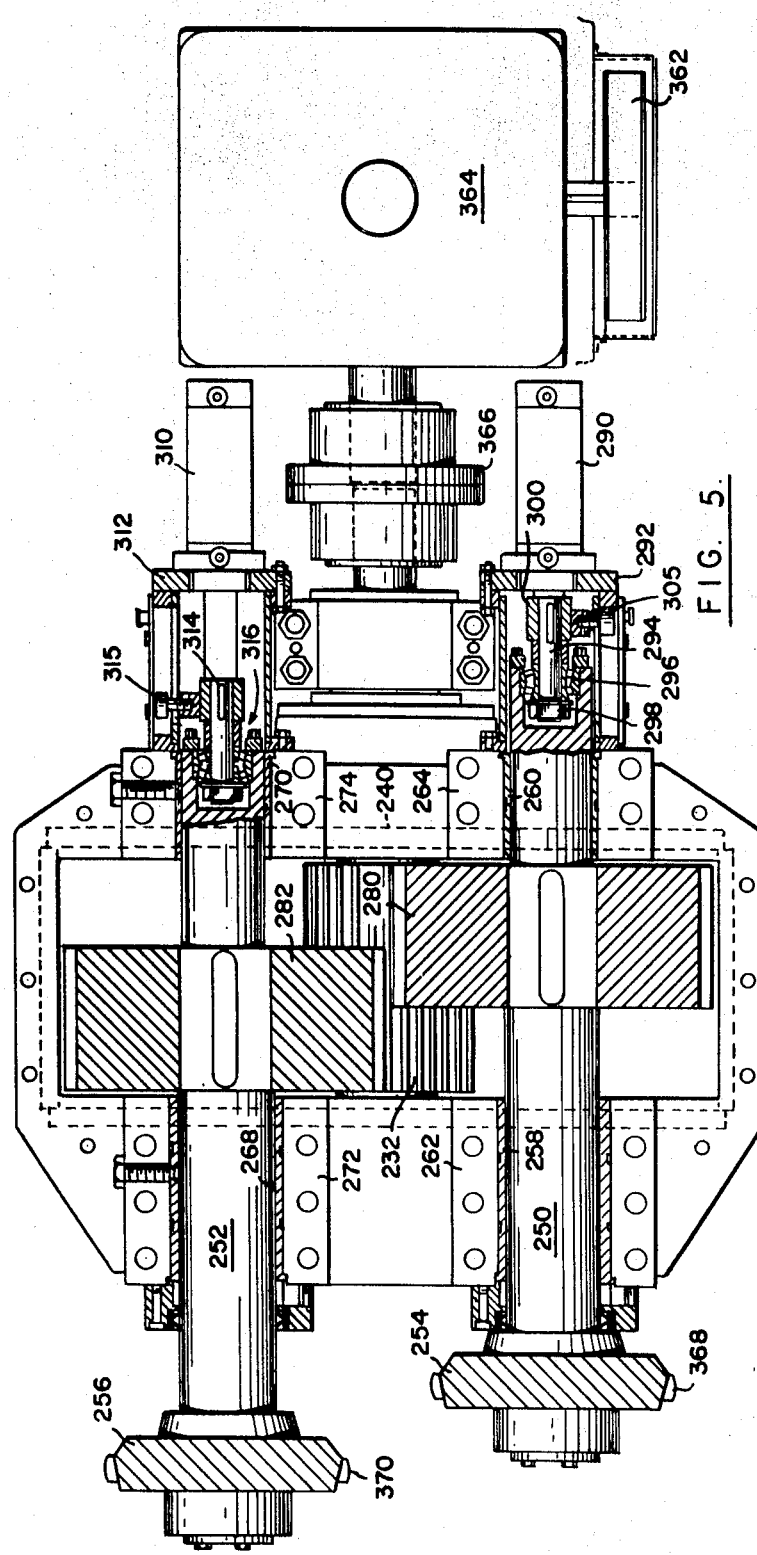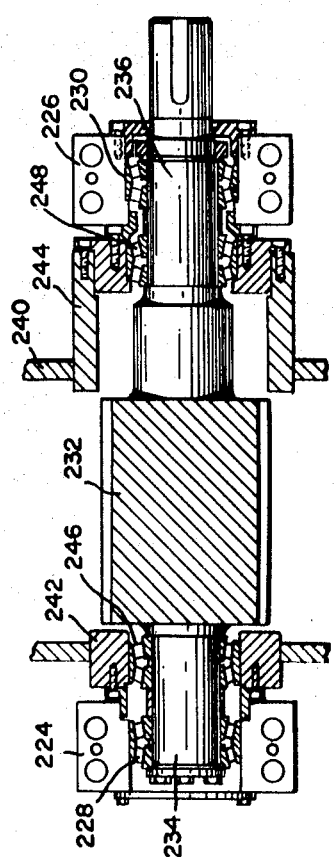

Nov. 9, 1971 W. W. EIBE ETAL 3,618,462
BILLET CHIPPER
Original Filed June 14, 1968 5 Sheets-Sheet 5

INVENTORS
WERNER W. EIBE &
RICHARD W. TEPEL
BY
ATTORNEY

United States Patent Office 3,618,462
Patented Nov. 9, 1971

3,618,462
BILLET CHIPPER
Werner W. Eibe and Richard W. Tepel, Pittsburgh, Pa., assignors to Blaw-Knox Company, Pittsburgh, Pa.
Original application June 14, 1968, Ser. No. 737,042, now Patent No. 3,496,831, dated Feb. 24, 1970. Divided and this application Dec. 4, 1969, Ser. No. 882,264
Int. Cl. B23c 3/00
U.S. Cl. 90—11 R
6 Claims

ABSTRACT OF THE DISCLOSURE

A billet chipper having a pair of rotating cutting heads arranged to be selectively moved into a working position for removing defects from a billet moved past a chipping station. One of the cutting heads is adapted to remove defects from the billet as the billet is moved in one direction past the chipping station and the other of the cutting heads is adapted to remove defects from the billet as it is moved in the opposite direction past the chipping station. The billet chipper is also provided with mechanism for clamping the billet securely during chipping so as to prevent vibration thereof as a result of the forces developed by the cutting heads.

CROSS-REFERENCE TO RELATED APPLICATION

This application is a division of application Ser. No. 737,042, filed June 14, 1968, now Pat. No. 3,496,831.

BACKGROUND OF THE INVENTION

The invention relates to a machine known in the art as a billet chipper. The billet produced by continuous casting machines and billet mills generally have small cracks or defects on their surfaces. These cracks must be removed before the billets are delivered to the finishing mills so that these imperfections will not appear in the final product. The billet chipper is a machine for removing these cracks or defects from the billet.

Originally, the removal of the cracks or defects on the surfaces of billets by a cutting tool, which procedure is known in the art as "chipping," was performed manually by means of various hand operated tools. The art then advanced to the use of machines in the general nature of a planer, there being provided in this machine a rotating cutter for use in the chipping of the cracks from the billet. However, these prior machines had several disadvantages. Firstly, since a rotating cutter of the type adapted to remove defects could only function properly with the billet moving in one direction relative thereto, it was necessary to return the billet past the chipping station after each chipping operation. During this return movement, no productive work could be performed on the billet wherefore both the operator of the machine and the machine itself were unproductive.

Another problem associated with prior art billet chippers results because many billets as they are delivered to the chipper are not straight and, in fact, may often have a substantial twist and curvature. Accordingly, a problem encountered is that of holding the curved billet securely at the chipping station so as to secure it against deflection or vibration during the chipping operation.

SUMMARY OF THE INVENTION

Briefly stated, the billet chipper in accordance with this invention overcomes the above discussed problems of prior machines by providing in combination novel billet handling and chipping mechanisms. The problem resulting from the wasted return time of the billet is obviated by the provision of chipping mechanism comprising a pair of rotating cutter heads mounted so that, by selection, either one may be moved into an operating position. The cutter heads are arranged so that one is adapted, when rotating in a predetermined direction, to remove material from a billet moving past the chipping station in one direction, and the other cutter head is adapted, when rotating in its predetermined direction, to remove material from the billet when it moves past the chipping station in the opposite direction. Accordingly, the operator of the machine moves one of the cutter heads into operative position when the billet is moved in one direction past the chipping station, and moves the other of the cutting heads into operative position when the billet is moved in the opposite direction past the chipping station. By this arrangement, the billet may be worked on during each movement past the chipping station and there is no wasted motion of the billet. Thus, whereas with the prior machines it was necessary to move a rectangular billet as many as eight times past the chipping station, with the mechanism of the present invention this movement can be reduced to four passes across the chipping station, since either one of the cutter heads can be operable to chip a side of the billet. Moreover, by reason of the use of a pair of cutter heads, the intervals between each "down time" of the machine for replacement of worn cutting elements can be reduced.

The problems of vibration and shock during a cutting or chipping operation are obviated by the provision of a plurality of pairs of guide rollers and at least one clamping roller which is pressed against the billet to clamp the same with such considerable force that the forces developed in cutting can not deflect or vibrate the billet. Thus, even though the billet may hve an appreciable curvature, by placing this billet under the tight grasp supplied by the rollers, the potential forces produced by the cutting tool are prevented from causing vibration or deflection of the billet and therefore shock is substantially eliminated.

BRIEF DESCRIPTION OF THE DRAWINGS

FIG. 5 is a view of the chipper head taken on line 5—5 of FIG. 2;

FIG. 6 is a sectional view taken on line 6—6 of FIG. 2; and

DESCRIPTION OF THE PREFERRED EMBODIMENT

While the billet chipper will be described with reference to its use with a billet having a square cross-section, the billet chipper in accordance with the broader aspects of the invention is adaptable for use with billets having round, square or rectangular cross-sections. Also, while the billets are generally very long, such as about 60 feet, it will be apparent that the billet chipper is capable of handling billets of various lengths.

Figure 1:
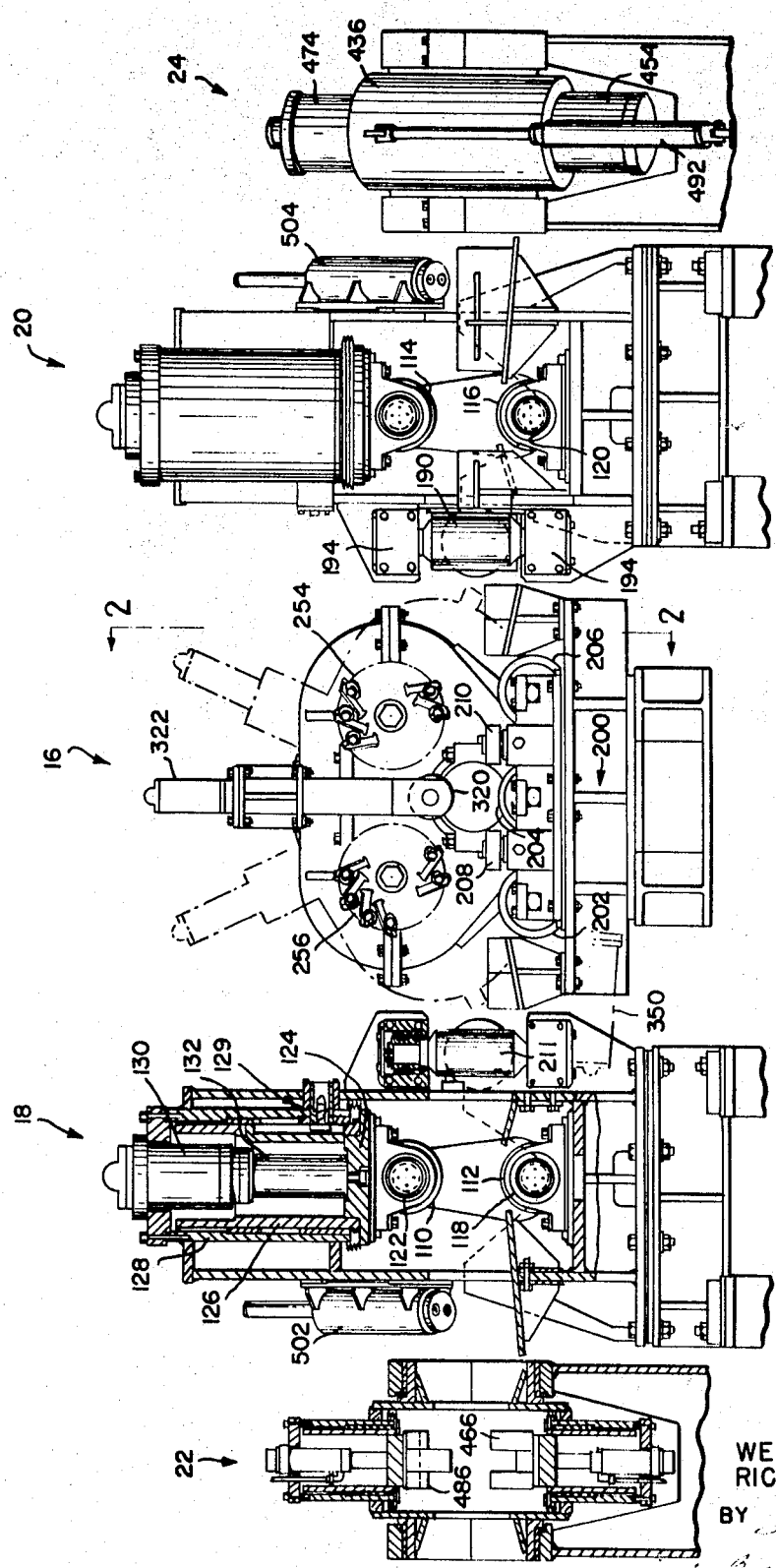
FIG. 1 is a front view of the parts of the billet chipper in the region of the chipping station.

The general arrangement of the billet chipper in accordance with the invention is shown in FIGS. 1A and 1B of said related application wherein there is shown a billet supply or feed table adjacent an input table extending along one side of the machine. On the other side of the machine there is provided an output table. Between the input and output tables there is a chipper assembly 16, a pair of feed roll assemblies 18 and 20 and a pair of billet turners 22 and 24, these mechanisms being shown in more detail in FIG. 1.

Figure 2:
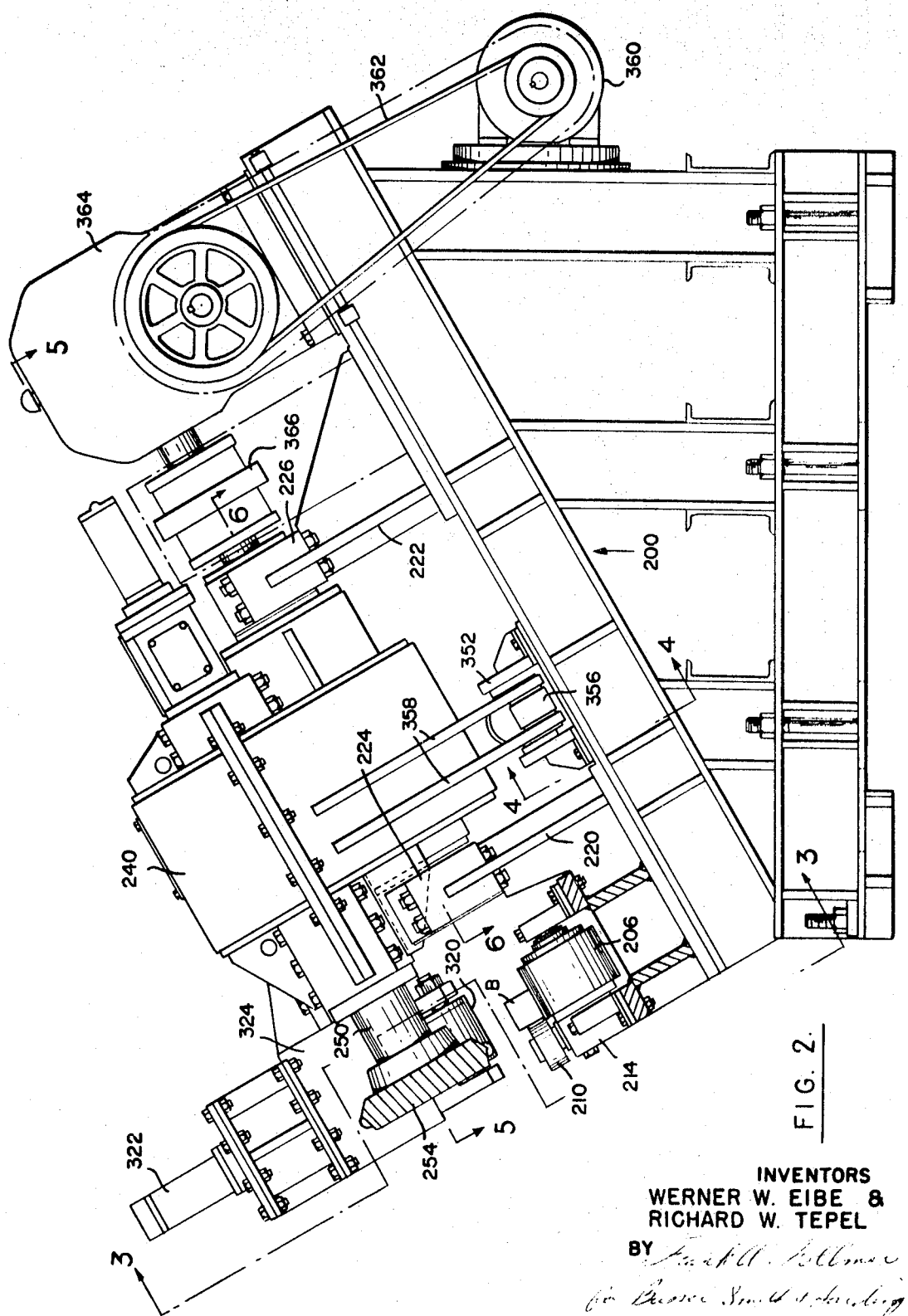
FIG. 2 is a side elevation of the chipper assembly taken on line 2—2 of FIG. 1.
Figure 7:
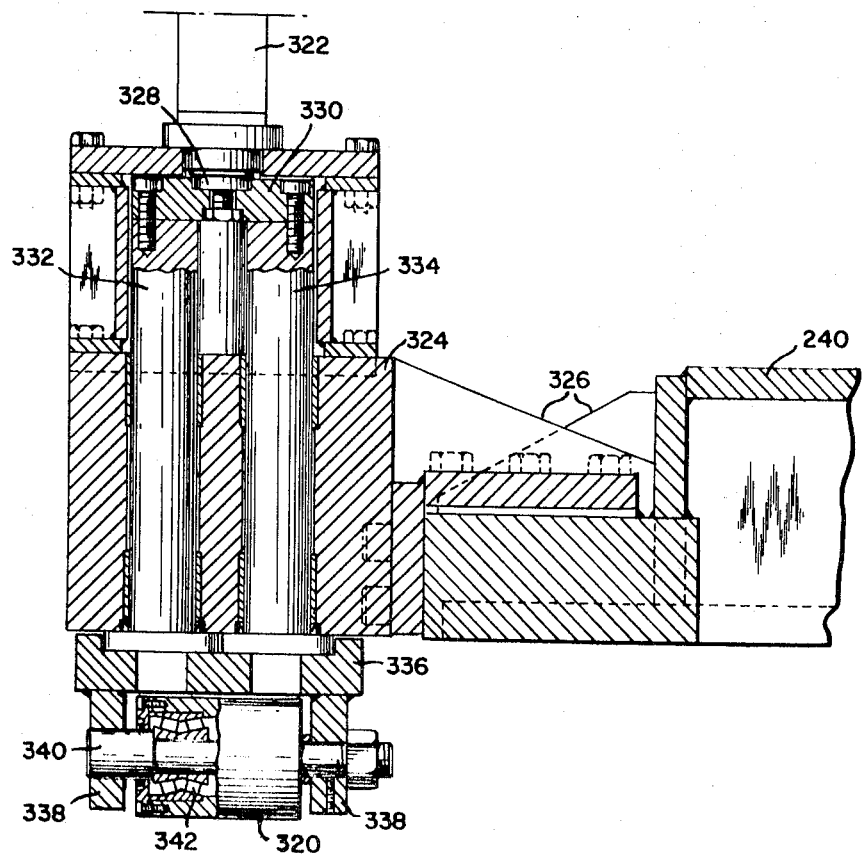
FIG. 7 is a sectional view taken on line 7—7 of FIG. 3.

There are provided a pair of feed roll assemblies 18 and 20 located on either side of the billet chipping station and serving to feed a billet in either direction past the billet chipping station. The feed roll assemblies 18 and 20 may receive billets from or deliver billets toward either the inlet table or the outlet table. The feed roll assemblies 18 and 20 are essentially identical and are shown in FIGS. 2, 7 and 8 of said related application.

The feed roll assembly 18 comprises an upper feed roll 110 arranged to be moved into driving engagement with the billet at its upper side which is to be chipped, and a lower feed roll 112 aligned with the upper feed roll 110 and spaced therefrom to engage the lower side of the billet opposite to the side to be chipped.

The feed roll assembly 20 comprises an upper feed roll 114 arranged to be moved into driving engagement with the billet at its upper side which is to be chipped, and a lower feed roll 116 aligned with the upper feed roll 114 and spaced therefrom for driving engagement with the lower side of the billet opposite to the side to be chipped.

Each of the lower feed rolls 112 and 116 is mounted in a fixed position and supported on the framework of the machine. The feed roll 112 is rotatably supported on a pair of bearings 118 supporting opposite ends thereof. The feed roll 116 is journalled at opposite ends in a pair of bearings 120.

Each of the feed roll assemblies 18 and 20 is provided with means for moving the associated upper feed roll between an upper retracted position and a lower position in driving engagement with the billet. To this end, the upper feed roll 110 is journalled in a pair of bearings 122 secured to a plate 124. The plate in turn is secured, as by welding, to the lower end of a tubular sleeve 126 mounted for sliding movement within a tubular member 128 mounted on the framework of the machine. A suitable cam and slot arrangement 129 is provided to prevent relative rotation between slide 126 and tubular member 128. Mounted on top of tubular member 128 is a hydraulic cylinder or actuator 130 comprising a rod 132 which is secured at its outer end to the plate 124. By this arrangement, the application of hydraulic pressure to the hydraulic cylinder 130 causes downward movement of the rod 132 and the feed roll 110 which is carried by the plate 124 to thereby cause engagement of the feed roll 110 with the billet therebeneath. Actually, the billet is pressed between the opposed feed rolls 110 and 112 to provide the feeding engagement.

As is best shown in FIG. 8 of said related application, a similar arrangement is provided for the feed roll assembly 20.

It will be noted that the parts are arranged so that the two pairs of feed rolls for the assemblies 18 and 20 will operate to drive the billet in the same direction. Thus, while the feed roll pairs 110 and 112, 114 and 116 can be actuated to drive the billet in either direction by reversal of a motor, the parts are arranged so that the feed rolls for each of the assemblies 18 and 20 will operate to drive the billet in the same direction at the same time.

Each of the feed roll assemblies 18 and 20 is provided with a pair of side rollers for positioning the billet by contact with the surfaces thereof adjacent the surface to be chipped. To this end the feed roll assembly 20 is provided with a pair of side rollers 190 and 192 located adjacent the feed rolls 114 and 116. The side roller 190 is mounted in a fixed location and is journalled at its opposite ends in a pair of bearings 194. The side roller 192 is journalled in bearings at the opposite ends thereof which are secured to a plate. As is described in said related application, a billet positioned between the rollers 190 and 192 is clamped therebetween under the pressure of the hydraulic actuator.

The feed roll assembly 18 is provided with a similar side roll construction, there being provided a fixed side roller 211 and a movable side roller 213. The side roller 213 is actuated toward the roller 211 by an arrangement involving a hydraulic actuator.

It will be apparent that in each feed roll assembly, the billet is confined on all four sides, the feed rolls being in driving engagement with two opposite sides of the billet and the side rollers being in clamping engagement with the billet at the other two opposite sides.

It is desirable that the motor for driving the feed rolls, be adjustable to vary the speed of the feed rolls. For example, it is desirable that the feed rolls be driven at a speed suitable for the chipping operation, at another speed for positioning the billet, and at a third speed for a fast traverse of the billet past the billet chipping station. station.

The chipper assembly 16 comprises a supporting framework generally indicated at 200. Three billet supporting rollers 202, 204 and 206 are journalled in suitable bearings and are arranged to support the billet at the bottom side thereof opposite to the side to be chipped as it best illustrated in FIG. 3. The billet engaging portions of the rollers 202, 204 and 206 extend along the pass line of the chipper. A pair of side supporting rollers 208 and 210 are rotatably mounted in suitable bearings 212 and 214, respectively. The side rollers 208 and 210 are arranged at right angles to the rollers 202, 204 and 206 and to provide support for the side of the billets adjacent the side to be chipped and facing forwardly. Accordingly, the two groups of rollers support the billet on the same sides as the rollers on the input and output tables and support the billet in the same angular position presenting the side to be chipped at an angle to the horizontal and facing the operator.

Guides 216 and 218 are provided at the input table end and the output table end, respectively, of the chipper assembly 16. The guides 216 and 218 serve to direct or guide an approaching end of a billet into the supporting confines of the rollers 202, 204 and 206 and the rollers 208 and 210. As will be apparent hereafter, the two groups of rollers serve to take the forces applied to the billet by the chipping heads during a chipping operation.

The chipper assembly 16 comprises a stationary frame including a pair of upstanding support members 220 and 222 mounted at their lower ends on the frame 200 as shown in FIG. 2. The upper ends of the supporting members 220 and 222 are provided with annular casings 224 and 226 containing rolling bearings 228 and 230, respectively.

A pinion gear 232 is supported at axially extending cylindrical end portions 234 and 236 on the bearings 228 and 230, respectively, whereby the pinion gear 232 is rotatably supported within said bearings. As will be described hereafter, the pinion gear 232 serves as the drive for the cutter heads of the chipper. However, the pinion gear 232 has another function which is that of supporting a pivotal frame of the chipper assembly.

The chipper assembly comprises a pivoted frame including a gear box 240 having cylindrical portions 242 and 244 projecting in axial alignment from the sides thereof to enclose portions of the ends 234 and 236, respectively, of the pinion gear 232 as is best shown in FIG. 6. Rolling bearings 246 and 248 are arranged, respectively, between the concentric overlapping portions 242 and 244 and the portions 234 and 236 so that the gear box 240 is rotatably supported on the ends 234 and 236 of the pinion gear 232 for pivotal movement around the axis of the pinion gear. The purpose of this arrangement will appear more fully hereafter.

Various elements of the chipper assembly 16 are mounted on the gear box 240 for movement therewith. As best shown in FIG. 5, the arbors 250 and 252 which carry the cutting heads 254 and 256, respectively, at their forward ends are rotatably mounted on sides of the gear box 240. The arbor 250 is rotatably mounted in pair of sleeve bearings 258 and 260 mounted in cylindrical bores in members 262 and 264 supported on the gear box 240. The arbor 252 is similarly mounted in sleeves 268 and 270 carried by members 272 and 274 supported on the gear box 240.

The arbors 250 and 252 are provided with gears 280 and 282, respectively, which rotate therewith and which are arranged to engage the pinion gear 232 so as to be driven thereby.

As shown in FIG. 5, the gear box 240 is constructed to permit axial movement of the gears 280 and 282, the arbors of these gears being mounted and constructed for axial movement. As illustrated in FIG. 5, the gear 282 is in the forward or extended end of its permissible travel, and the gear 280 is in the rearward or retracted end of its travel. This movement is necessary to permit the positioning of the cutting heads 254 and 256 at a proper location above the defects in the billet for effecting the chipping operation.

Means are provided for actuating the cutting heads 254 and 256 between the extended and retracted positions thereof. The actuating means for the cutting head 254 comprises a hydraulic cylinder 290 supported on the end of a housing 292 which is bolted to the member 264. The actuator rod 294 of the cylinder 290 extends into housing 292 and is connected to the end of the arbor 250 by an arrangement which provides for conjoint axial movement between the arbor 250 and the rod 294 but permits rotation of the arbor relative to the rod 294. This connecting means comprises a thrust bearing 296 mounted between the rod 294 and a cylindrical bore in the end of arbor 250, a lock nut 298 at the end of the rod 294 on one side of the thrust bearing 296, and a tubular member 300 secured to rod 294 on the other side of the thrust bearing 296. By this arrangement, when the rod 294 is moved to the left, the member 300 transmits movement to the arbor 250 by way of the thrust bearing 296, and when the rod 294 is moved to the right, the lock nut 298 transmits movement from the rod 294 to the arbor 250. The rod 294 carries a cam follower 305 which cooperates with a suitable guide track for preventing rotation thereof during its stroke.

The means for actuating the cutting head 256 between its extended and retracted positions are similar to that for the cutting head 254. Such means are best shown in FIG. 5 and comprise a hydraulic actuating cylinder 310 supported on a housing 312 which is, in turn, supported on the member 274. The actuator rod 314 of the cylinder 310 is connected to the end of the arbor 252 by a connection indicated generally at 316. The connection 316 is similar to that described with respect to the arbor 250 and transmits the axial movement between the rod 314 and the arbor 252 while permitting rotation of the arbor relative to the rod 314. It is noted that the rod 314 carries a cam follower 315 which cooperates with a guide track to prevent rotative movement of the rod 314 of the cylinder 310 as the rod 314 is actuated through its forward and return strokes.

Means are provided for the application of a clamping force onto the billet as it is being chipped by one of the cutting heads. The application of this force must be sufficient to hold or clamp the billet with sufficient force to prevent vibration thereof as a result of the forces applied to the billet during a chipping operation. Such means comprises a hold down or clamping roller 320 which is moved into contact with the billet onto the side thereof being chipped to thereby force the billet toward the three rollers 202, 204 and 206.

The actuating means for the roller 320 comprises a hydraulic actuator or cylinder 322 mounted on top of a housing 324 supported on the gear box 240 by suitable brackets 326. Referring to FIG. 7, the actuator rod 328 of the hydraulic cylinder 322 is secured at its lower end to a plate 330 which is connected to a pair of rods 332 and 334 extending downwardly through guide bores in the lower part of housing 324. The lower ends of the rods 332 and 334 extend beyond the lower end of the housing 324 and are connected by suitable mounting screws to a plate 336 by mounting screws (not shown). A pair of arms 338 project downwardly in spaced relation from the plate 336 and carry an axle 340 thereon. The roller 320 is supported on the axle 340 by a suitable roller bearing means 342.

In operation, the application of hydraulic pressure to the cylinder 322 causes an extension of the rod 328 therefrom and a corresponding downward movement of the rods 332 and 334. Since the roller 320 is secured for movement with the rods 332 and 334, the roller 320 is also moved downwardly until it contacts the side of the billet to be chipped. The hydraulic pressure will be transmitted to the billet at the line of contact with roller 20 to thereby press the billet towards the rollers 202, 204 and 206. This clamping action on the billet serves to hold the same against vibrations as a result of the forces produced during a cutting action of the cutting heads.

Figure 3:
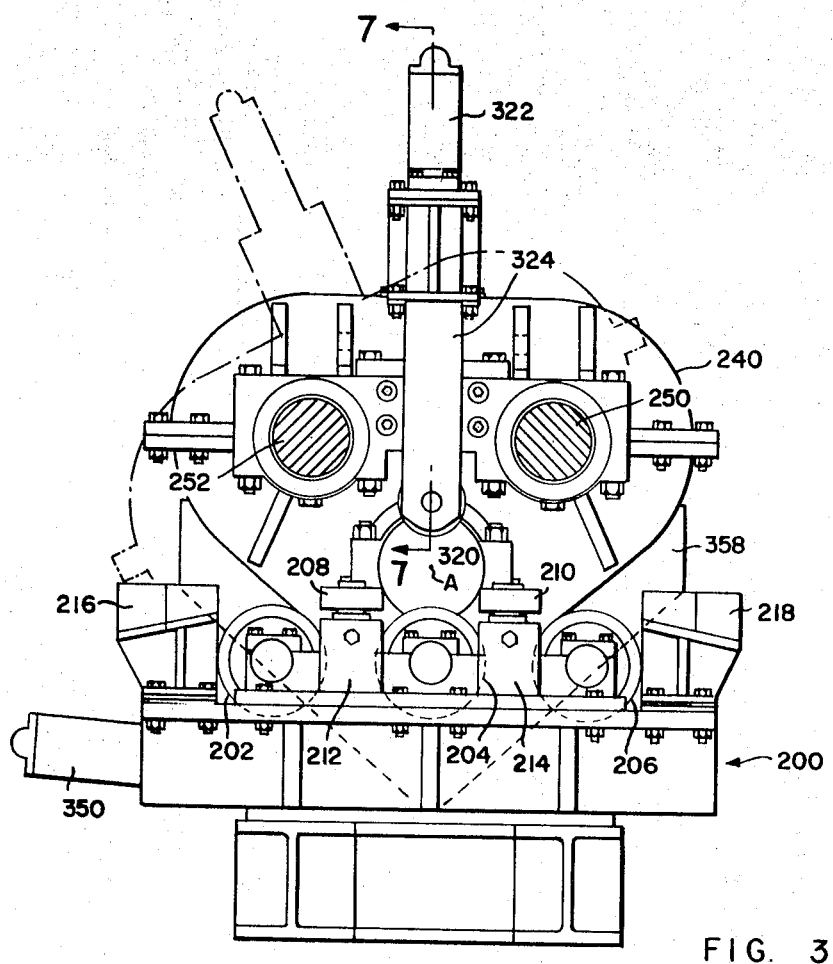
FIG. 3 is a view taken on line 3—3 of FIG. 2.

Means are provided for actuating the pivoted frame described above to tilt or rotate from a neutral position shown in solid lines in FIG. 3 in either direction so as to place one or the other of the cutting heads 254 and 256 in an operative position. The two limit positions to which the pivoted frame can be moved are illustrated in dashed lines in FIG. 1, the angular movement being approximately 25° in either direction from the neutral position.

The means for actuating the pivoted frame comprises a hydraulic actuator or cylinder 350 pivotally supported on a trunnion-like mounting 352 on the frame of the chipper assembly. The actuator rod 354 of the hydraulic cylinder 350 is connected by a clevis-type connection 356 to the lower ends of a pair of plates 358 extending downwardly from the gear box 240.

Figure 4:
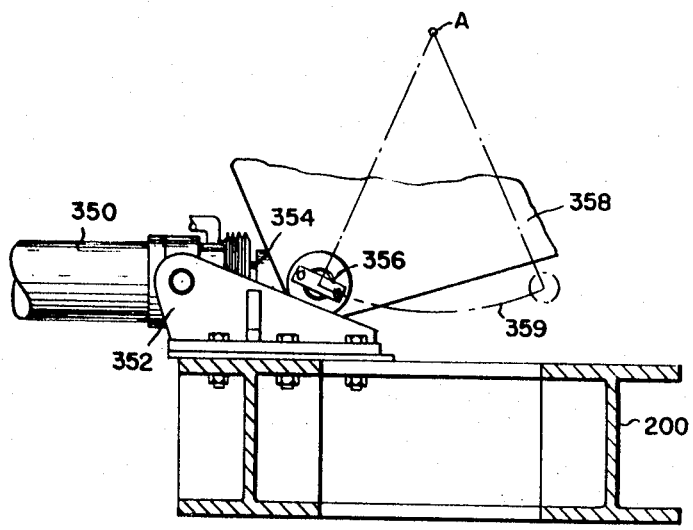
FIG. 4 is a fragmentary view of a detail of the chipper assembly taken on line 4—4 of FIG. 2.

In operation, by the application of hydraulic pressure to either end of the cylinder 350, the axis of the clevis 356 is moved to any of the positions along the arc 359 shown in FIG. 4. Since the axis of the clevis moves in an arc, it will be apparent that the cylinder 350 will pivot about the axis of the trunnion mounting 352 as the actuator rod 354 is extended to the desired position. It will be apparent that since the pivoted frame is supported on the ends of the pinion gear 232, the pivotal movement of this frame will be about the axis of the pinion 232, this axis being indicated at A in FIGS. 3 and 4. It will also be noted that as this pivoting action takes place, the gears 280 and 282 will rotate about the pinion axis A and will be maintained in driving engagement with the pinion 232 by reason of the mounting arrangement described above.

Thus, when the operator wishes to move the cutting head 254 into a chipping position, the hydraulic cylinder 350 is actuated to retract rod 354 to pivot the pivoted frame in a clockwise direction about the axis of the pinion axis as viewed in FIGS. 3 and 4. Conversely, when the operator desires to move the cutting head 256 into operative position, the cylinder 350 is actuated to extend its rod 354 and thereby cause a counterclockwise pivotal movement of the pivoted frame about the axis of the pinion 232.

The drive means for the pinion gear 232 is best shown in FIGS. 2 and 5 and comprises a motor 360 mounted on the framework 200 of the chipper assembly. The outlet shaft of the motor is connected by a belt-type connection 362 to drive the input shaft of a reducer 364. The outlet shaft of the reducer 364 is connected to a coupling 366 the output end of which is connected in driving relationship to the end of the pinion gear 232. In this manner, the operation of the motor 360 is transmitted through the reducer 364 to cause rotation of the pinion 232 at a rate of speed appropriate to effect a cutting operation. It will be apparent that the rotation of the pinion 232 is transmitted through gears 280 and 282 to cause rotation of the cutting heads 254 and 256.

The cutting heads 254 and 256 may take various forms but are preferably a milling-type of cutter comprising a plurality of cutting tools 368 and 370 respectively, spaced circumferentially about the associated cutting head. The cutting tools are shaped as shown on FIG. 5 to cut a relatively flat cut in the billet. Moreover, it will be noted that the cutting heads 254 and 256 are only effective to cut in one direction. The cutting head 254 arranged to rotate in a clockwise direction in FIG. 1 and the cutting tools 368 will be operative to chip a billet moving from the input table 12 toward the output table 14 past the chipping station. Conversely, the cutting head 256 is rotated in a counter-clockwise direction as viewed in FIG. 1 and the cutters 370 are shaped and arranged to perform cutting on a billet moving from the output table toward the input table past the chipping station.

In the operation of the chipper assembly 16 to remove defects from the billet, the operator determines in which direction the billet is to be moved during chipping. He then actuates a suitable control which causes the appropriate chipping head 254 or 256 to rotate in the proper cutting direction for cutting by controlling the direction of rotation of the motor 360. There are also provided suitable hydraulic controls for controlling the operation of the hydraulic actuators 290 and 310 for actuating the arbors 250 and 252 for the cutting heads 254 and 256 and tilt cylinder 350 of the chipper assembly 16. These motions are controlled by a conventional manual control involving a stick which controls the movement of the cutting heads in any desired direction by controlling the tilting movement and the axial movement thereof. The control also actuates the hold down clamp roller 320 to maintain a billet in fixed or clamped position during a chipping operation.

Thus, assuming the chipping operation is to be performed on a billet moving from the input table toward the output table, the operator sets up the control to tilt the chipper assembly to place the right cutting head 254 downwardly and to cause rotation thereof in a clockwise direction as viewed in FIG. 1. By means of the stick control, the operator can manually cause manipulation of the cutting head 254 for chipping the defects of the billets as it is moving from the input table toward the output table past the chipping station. It will be apparent that a similar operation is effected when chipping a billet moving from the output table toward the input in which case the left chipping head 256 is tilted downwardly and is caused to rotate in a counter-clockwise direction.

Desirably, the clamp roller 320 is automatically lowered and moved to the clamping position whenever the pivoted frame chipper assembly 16 leaves the neutral position, suitable limit switches being provided to achieve this interlocking function. Moreover, the clamping roller 320 should remain in the downward position until the chipper assembly is returned to the neutral position.

Means are provided for turning a billet to successively present the various sides thereof in position to be chipped. Such means comprises the turners 22 and 24 which are essentially identical in construction. Each of the turners 22 and 24 are constructed in the manner illustrated in FIGS. 16 and 17 of said related application. Each of the turners 22 and 24 comprises a turner supporting frame provided with a pair of horizontally extending, spaced, aligned journal supports. Rotatably mounted in the supports is a turner body 436 comprising a pair of projecting tubular members and journalled within the supports for rotatable support on suitable sleeve bearings.

The turner body 436 is provided with a pair of openings for receiving the billets moving into the turner assembly. A pair of guides provided with ramps serve to guide the billets into the openings.

Jaw means are provided for gripping a billet extending within the turner chamber between the openings, the jaw means serving to grip the billet during a turning movement thereof. Such means comprises a lower jaw means including a lower cylindrical housing 454 carried by the turned body 436. A hydraulic actuator cylinder is mounted within the housing 454 and has the end of its actuator rod secured to a plate. The plate is secured to the end of a tubular sleeve arranged for axial sliding movement within a cylindrical bore within housing 454. The sleeve is guided for a straight sliding movement by means of a roller and guide slot arrangement which serves to prevent rotation of the sleeve as it is moved axially. A billet gripping jaw 466 is secured to the plate, as by mounting screws, and comprises a pair of spaced jaw members provided with right angular gripping surfaces. Accordingly, the billet will be contacted along two adjacent sides by the gripping surfaces. It will also be apparent that the hydraulic cylinder can be actuated to cause the extending or its actuator rod to thereby move the gripping jaws toward a billet positioned within the turner chamber.

There is also provided an upper jaw means including an upper cylindrical housing 474 carried by the turner body 436. A hydraulic actuator is mounted within the housing 474 and has the outer end of its actuator rod secured to a plate. The plate is secured to the end of a tubular sleeve arranged for axial sliding movement within a cylindrical bore within the housing. The sleeve is guided for a straight axial movement by a suitable roller and guide slot arrangement which holds the sleeve against rotation relative to the housing 474. A billet gripping jaw 486 is secured to the plate as by mounting screws and comprises a jaw member provided with right angular gripping surfaces. The gripping surfaces thus contact a billet on two adjacent sides thereof. It will be apparent that actuation of the hydraulic actuator can cause an extension of the rod to cause the gripping jaw to move toward a billet contained within the turner chamber.

Means are provided for causing a turning movement of the turner body 436 and the parts carried thereby.

It will be noted that a turning operation of a billet can be performed by means of either the turner 22 or the turner 24 or by the use of both turners in engagement with the billets.

Means are provided to engage a billet during a part of the billet turning cycle when, after the billet has been turned and released by the gripping mechanism, the billet is lowered back onto the table feed rollers. This means comprises a pair of hydraulic actuators 502 and 504 mounted on the frames of the feed roll assemblies 18 and 20 adjacent the turners 22 and 24, respectively. The actuator 502 cooperates with the turner 22 and the actuator 504 cooperates with the turner 24. Briefly stated, the actuators serve as hold down means by positioning their actuator rods to engage the billet and bias the same downwardly during a portion of the turning cycle.

In order to provide a better understanding of the broader aspects of the billet chipper in accordance with the invention, the following general description of the overall operation is deemed to be of value.

Billets with visible markings on their surfaces locating the defects are delivered to a feed table by suitable billet handling equipment.

The operator then causes the billet to be fed toward the chipping station by means of the rollers. The billet is stopped after the leading end thereof is positioned within the feed roll assembly 18. The operator then actuates the hydraulic cylinders of the feed roll assemblies to force the feed rolls 110 and 112 and the side rollers 211 and 213 into contact with the billet and energizes a motor to drive the rolls 110 and 112 at the chipping speed to feed the billet toward the chipping station.

As a portion of the billet having a defect thereon passes the chipping station of the chipper assembly 16, the operator tilts the cutting head 254 downwardly into cutting engagement with the billet. The cutting head 254 will be positioned transversely of the billet by the actuation of the hydraulic cylinder 290 controlling the movement of its arbor so as to cut the portion of the billet having the defect thereon. Also, the clamp roller 320 of the chipper assembly 16 is actuated into engagement with the billet to clamp the same tightly and prevent vibration thereof during a chipping operation.

When the leading end of the billet moving from the input table to the output table passes between the rollers 114 and 116 of the feed roll assembly 20, the operator actuates the hydraulic cylinders thereof to place the feed rolls 114 and 116 into driving engagement with the billet and the side rollers 190 and 192 into contact with the billet. It will thus be noted that as the billet continues to be fed from the input table 12 toward the output table 14, the billet is contacted by all the various rollers of the two feed roll assembly means 18 and 20 and the chipping assembly 16, namely, feed rolls 110, 112, side rollers 211 and 213, clamp roller 320, the chipper assembly support rollers 202, 204, 206, 208, and 210, the feed rolls 114 and 116, and the side rollers 190 and 192. Accordingly, the billet is very securely held in the desired position for chipping.

As the first side of the billet has had the defects chipped therefrom, it has been fed onto the output table. The operator now positions the left end of the billet within the turner chamber of the turner 24, such as by the actuation of the output rollers to feed the billet toward the input table. The billet is now turned 90° by the operation of the turner 24.

The billet is then fed from the output table 14 toward the input table 12 by means of feed roll assemblies 20 and 18 in generally the same manner described above when the billet is fed in the opposite direction. The only essential difference is that the feed rolls are rotated in the opposite directions.

When a portion of the billet containing a defect approaches the chipping station, the operator by the use of the control stick tilts the chipper head 256 downwardly and positions the same in the proper transverse position to effect a chipping operation to remove these defects. This is achieved by controlling the tilt cylinder 350, the cutter head cylinder 310, and the direction of rotation of motor 360. During this chipping operation, the clamp roller 320 is, of course, moved downwardly to clamp the billet in the region of the chipping station to prevent vibration thereof.

After the second side of the billet has been chipped, lets assume it is now positioned entirely on the input table. The billet is then fed into the chamber of the turner 22 such as by operation of the input rollers. The turner 22, in cooperation with the elevator means of the input table, is now actuated to turn the billet 90° to present the third side thereof in position for the removal of the defects thereon by a chipping operation. The billet is then fed from the input table 12 through the feed means 18 and 20 and the chipper assembly 16 toward the output table 14, with the defect removal being achieved by the cutter head 254 in the manner described above.

When the third side has had the defects removed therefrom, the billet is again turned 90° by operation of the turner assembly 20 as was described previously to present the fourth side of the billet in position for chipping. The billet is then fed from the output table toward the input table by the operation of the feed rollers 18 and 20 as was described above, during which movement the operator removes the defects by means of the cutter head 256.

The billet is now positioned on the input table and has had defects removed from all four sides thereof. The operator then actuates the input table rollers 48 and the feed rollers 18 and 20 to move the billet onto the output table 14. The operator then actuates the desired kick-off means to remove the billet from the output table.

The above description relates to removal of defects from a billet having defects on all four sides thereof. It will be apparent, however, that if a billet does not have a defect on one of its sides, during a turning operation the turner will be actuated through successive turning operations to turn the billet twice through 90° movement to thereby turn past this side which has no defects.

It is to be understood that the above description is illustrative and it will be apparent that various changes may be made in the construction and arrangement of parts without departing from the scope of the invention. Accordingly, it is not desired to be limited except as required by the following claims.

What is claimed is:

1. In a billet chipper for removing surface defects from an elongated billet having a generally rectangular cross-section, a chipper assembly defining a chipping station where the defects are removed from the billet and comprising a cutting head means movable from an inactive position toward a billet moving past the chipping station to engage a first billet surface which is to have defects removed, means providing a rolling support for the billet on the surface portion thereof opposite said first billet surface, means providing a rolling support for the billet at right angles to said first-mentioned rolling support, said rolling support means receiving the forces applied to the billet during a cutting operation and being constructed and arranged to support said billet so that said first billet surface is inclined to the horizontal, and means movable from a retracted position into contact with said first billet surface at the cutting station to apply a substantial force to said billet toward said rolling support means to clamp the billet therebetween and prevent vibration thereof by reason of the forces developed during a cutting action by said cutting head means.

2. The combination according to claim 1 wherein said means to apply a force to said billet to clamp the same includes a roller for contacting said first surface of the billet in the region of said chipping station and said first-mentioned rolling support for the billet includes at least three closely spaced rollers for contacting the billet on the surface portion thereof opposite said first billet surface at a region opposite said roller of said clamping means and encompassing a contact region extending a substantial longitudinal extent in both directions from the contact region of said roller of said clamping means.

3. In a billet chipper for removing surface defects from an elongated billet, a chipper assembly defining a chipping station where the defects are removed from the billet and comprising a cutting head means movable from an inactive position toward a billet moving past the chipping station to engage a first billet surface which is to have defects removed, means providing a rolling support for the billet on the surface portion thereof opposite said first billet surface, means providing a rolling support for the billet at right angles to said first-mentioned rolling support, said rolling support means receiving the forces applied to the billet during a cutting operation, and means at the cutting station to apply a substantial force to said billet toward said rolling support means to clamp the billet therebetween and prevent vibration thereof by reason of the forces developed during a cutting action by said cutting head means, said cutting head means including a pair of rotating cutter heads, a frame mounted for pivotal movement about an axis transverse to the longitudinal axis of the billet, means mounting said pair of cutter heads on said pivoted frame, the rotational axes of said cutter heads being parallel to the axis of rotation of said pivoted frame and being spaced relative to one another angularly about the pivoted frame axis, and means for pivoting said frame in either direction about the axis thereof to cause either one of said cutter heads to be moved into cutting engagement with a billet at the cutting station.

4. A cutter assembly according to claim 3 including means for rotating said cutter heads about the axes thereof including a drive means associated with each cutter head and supported on said frame, a rotating pinion mounted to extend along the pivotal axis of said frame, said frame being mounted for pivotal movement about the axis of said pinion, said drive means for each cutter head being mounted for driving engagement with said pinion, said driving engagement between said pair of drive means being such that the drive means are movable axially relative to said pinion and will be maintained in driving engagement with said pinion during the pivotal movement of said frame.

5. In a billet chipper for removing surface defects from an elongated billet, a chipper assembly defining a chipping station where the defects are removed from the billet and comprising a cutting head means movable from an inactive position toward a billet moving past the chipping station to engage a billet surface which is to have defects removed, and means providing a support for the billet as it is moved past the chipping station, said cutting head means including a pair of rotating cutter heads, a frame mounted for pivotal movement about an axis transverse to the longitudinal axis of the billet, means mounting said pair of cutter heads on said pivoted frame, the rotational axes of said cutter heads being parallel to the axis of rotation of said pivoted frame and being spaced relative to one another angularly about the pivoted frame axis, and means for pivoting said frame in either direction about the axis thereof to cause either one of said cutter heads to be moved into cutting engagement with a billet at the cutting station.

6. A cutter assembly according to claim 5 including means for rotating said cutter heads about the axes thereof including a drive means associated with each cutter head and supported on said frame, a rotating pinion mounted to extend along the pivotal axis of said frame, said frame being mounted for pivotal movement about the axis of said pinion, said drive means for each cutter head being mounted for driving engagement with said pinion, said driving engagement between said pair of drive means being such that the drive means are movable axially relative to said pinion and will be maintained in driving engagement with said pinion during the pivotal movement of said frame.

References Cited

UNITED STATES PATENTS

| 3,250,179 | 5/1966 | Cavagnero | 90—11 R |
| 3,538,812 | 11/1970 | Morel et al. | 90—16 |
| 3,545,336 | 12/1970 | Savko | 90—15 R |

FOREIGN PATENTS

| 1,374,279 | 8/1964 | France | 90—24 E |

GIL WEIDENFELD, Primary Examiner

U.S. Cl. X.R.

90—17